US007780835B2

(12) United States Patent
Kinard et al.

(10) Patent No.: US 7,780,835 B2
(45) Date of Patent: Aug. 24, 2010

(54) METHOD OF MAKING A CAPACITOR BY ANODIZING ALUMINUM FOIL IN A GLYCERINE-PHOSPHATE ELECTROLYTE WITHOUT A PRE-ANODIZING HYDRATION STEP

(75) Inventors: John Tony Kinard, Greer, SC (US); Brian John Melody, Greer, SC (US); David Alexander Wheeler, Williamston, SC (US); Duane Earl Stenzinger, Simpsonville, SC (US); Albert Kennedy Harrington, Fountain Inn, SC (US)

(73) Assignee: Kemet Electronics Corporation, Greenville, SC (US)

( * ) Notice: Subject to any disclaimer, the term of this patent is extended or adjusted under 35 U.S.C. 154(b) by 0 days.

(21) Appl. No.: 12/427,838

(22) Filed: Apr. 22, 2009

(65) Prior Publication Data

US 2009/0205970 A1    Aug. 20, 2009

Related U.S. Application Data

(62) Division of application No. 11/099,917, filed on Apr. 6, 2005, now abandoned, which is a division of application No. 10/390,529, filed on Mar. 17, 2003, now Pat. No. 7,125,610.

(51) Int. Cl.
C25D 11/06    (2006.01)
(52) U.S. Cl. .................. 205/106; 205/234; 205/332
(58) Field of Classification Search ................. 205/106
See application file for complete search history.

(56) References Cited

U.S. PATENT DOCUMENTS

| | | | |
|---|---|---|---|
| 1,710,073 A | 4/1929 | Ruben | |
| 1,891,207 A | 12/1932 | Ruben | |
| 2,826,724 A | 3/1958 | Lilienfed | 317/230 |
| 3,733,291 A | 5/1973 | Alwitt et al. | 204/29 |
| 3,796,644 A * | 3/1974 | Bernard | 205/332 |
| 3,864,219 A * | 2/1975 | Dosch et al. | 205/213 |
| 4,113,579 A | 9/1978 | Randall et al. | 205/153 |
| 4,252,575 A | 2/1981 | Bernard | 148/6.27 |
| 4,481,084 A | 11/1984 | Chen et al. | 204/42 |

(Continued)

OTHER PUBLICATIONS

International Search Report, PCT/US2004/008037, Jul. 26, 2004, Lescop.

*Primary Examiner*—Patrick Ryan
*Assistant Examiner*—William T Leader
(74) *Attorney, Agent, or Firm*—Joseph T. Guy; Nexsen Pruet, LLC

(57) ABSTRACT

A capacitor comprising an aluminum anode and a dielectric layer comprising phosphate doped aluminum oxide and process for making the capacitor. The capacitor has a CV Product of at least 9 µF–V/cm$^2$ at 250 volts. Furthermore, the capacitor is formed by the process of: forming an aluminum plate; contacting the plate with an anodizing solution comprising glycerine, 0.1 to 1.0%, by weight, water and 0.01 to 0.5%, by weight, orthophosphate; applying a voltage to the aluminum plate and determining an initial current; maintaining the first voltage until a first measured current is no more than 50% of the initial current; increasing the voltage and redetermining the initial current; maintaining the increased voltage until a second measured current is no more than 50% of the redetermined initial current, and continuing the increasing of the voltage and maintaining the increased voltage until a final voltage is achieved.

12 Claims, 2 Drawing Sheets

U.S. PATENT DOCUMENTS

| | | | |
|---|---|---|---|
| 4,582,574 A | 4/1986 | Nguyen et al. | 204/27 |
| 4,863,880 A * | 9/1989 | Fujisada | 205/157 |
| 4,936,957 A * | 6/1990 | Dickey et al. | 205/96 |
| 5,837,121 A | 11/1998 | Kinard et al. | 205/322 |
| 5,926,357 A | 7/1999 | Elias et al. | 361/302 |
| 5,935,408 A | 8/1999 | Kinard et al. | 205/234 |
| 6,149,793 A | 11/2000 | Melody et al. | 205/234 |
| 6,231,993 B1 | 5/2001 | Stephenson et al. | 428/472.1 |
| 6,235,181 B1 | 5/2001 | Kinard et al. | 205/148 |
| 6,267,861 B1 | 7/2001 | Kinard et al. | 205/171 |
| 6,346,185 B1 | 2/2002 | Kinard et al. | 205/316 |
| 6,409,905 B1 | 6/2002 | Melody et al. | 205/234 |
| 6,436,268 B1 | 8/2002 | Melody et al. | 205/234 |
| 6,459,565 B1 | 10/2002 | Lessner et al. | 361/508 |

* cited by examiner

METHOD OF MAKING A CAPACITOR BY ANODIZING ALUMINUM FOIL IN A GLYCERINE-PHOSPHATE ELECTROLYTE WITHOUT A PRE-ANODIZING HYDRATION STEP

CROSS-REFERENCE TO RELATED APPLICATIONS

The present invention is a divisional application of U.S. patent application Ser. No. 11/099,917 filed Apr. 6, 2005, now abandoned, which is a divisional application of U.S. patent application Ser. No. 10/390,529 filed Mar. 17, 2003 which is now issued as U.S. Pat. No. 7,125,610.

BACKGROUND OF THE INVENTION

The present invention is related to an electrolyte solution for anodizing aluminum anode foil for use in electrolytic capacitors and the capacitors containing this anode foil.

We have found that low water content variations of the glycerine and orthophosphate-containing electrolytes described in U.S. Pat. No. 6,409,905, which is incorporated herein by reference thereto, may be used for the anodization of aluminum foil to voltages sufficiently high to facilitate the use of the aforementioned foil in intermediate and high voltage electrolytic capacitors.

Previously, the maximum anodizing voltage obtainable from the aqueous phosphate solutions traditionally used to anodize aluminum capacitor foil for applications requiring extreme foil stability and oxide hydration resistance was about 220 volts, as stated in U.S. Pat. No. 3,733,291. The corrosion of the foil being anodized in aqueous phosphate solutions increases with the anodizing voltage and is sufficiently severe to result in dielectric failure above about 220 volts. The corrosion by-products formed during aluminum foil anodizing in aqueous phosphate solutions must be removed from the solution via filtering, etc., or they will deposit upon the foil and anodizing tank components in amounts sufficient to interfere with the anodizing process.

The difficulties encountered with aqueous phosphate anodizing of aluminum foil for use in relatively low voltage capacitors are such that, in spite of the superior electrical stability of foil anodized in phosphate solutions nearly all of the low voltage foil produced today is anodized in non-phosphate solutions with the exception of a relatively small amount of phosphate which may be present to help impart hydration resistance. Due to the voltage limitations of aqueous phosphate anodizing solutions mentioned above, intermediate and high voltage capacitor foils have not traditionally been anodized in aqueous phosphate solutions.

Aluminum electrolytic capacitors for use at intermediate voltages typically contain anode foil hydrated by passing the foil through a hot water bath prior to anodizing, as defined in U.S. Pat. No. 4,582,574. These capacitors are typically for use at voltages from 150 to 250 volts and contain anode foil anodized to about 200 to 350 volts. This pre-anodizing hydration step is carried out in order to reduce the amount of electric current required to form the anodic oxide dielectric layer and is normally applied to foils to be anodized to 200 volts and above, as described in U.S. Pat. No. 4,481,073. By carefully adjusting the parameters of the pre-anodizing hydration process, as described in U.S. Pat. No. 4,242,575, the hydration process may be successfully employed with foils which are anodized to voltages significantly less than 200 volts. The energy savings associated with the pre-anodizing hydration process is sufficiently great that the vast majority of aluminum foil manufactured today is processed in this manner.

The crystallinity of the anodic oxide present on aluminum anode foil is another factor directly determining the cost of the foil for a given rating of capacitor. Crystalline anodic aluminum oxide has a higher withstanding voltage per unit thickness than does amorphous anodic aluminum oxide. As a result of the higher withstanding voltage of crystalline oxide, only about 10 angstroms of crystalline oxide is required to support each volt of applied field during anodizing as compared with approximately 14 angstroms for each volt of applied field for amorphous oxide. As a result of the higher withstanding voltage of crystalline anodic aluminum oxide, the capacitance of anode foil coated with crystalline oxide may be as much as about 40% higher than anode foil anodized to the same voltage but coated with amorphous oxide.

Crystalline anodic aluminum oxide may be readily produced by anodizing aluminum anode foil in solutions containing salts of dicarboxylic acids as the primary ionogen, as described in U.S. Pat. No. 4,481,084. Anodic oxide formation in solutions of dicarboxylic acid salts (generally at 70-95° C.) may be combined with a pre-anodizing foil hydration step to achieve a very significant savings in both energy and foil consumed per unit capacitance at a given anodizing voltage.

Hydration resistance, which is an important consideration for foil used in electrolytic capacitors, may be enhanced by the inclusion of a small amount of an alpha-hydroxy carboxylic acid (such as tartaric acid or citric acid) in the anodizing electrolyte solution, as described in U.S. Pat. No. 4,481,084. The tendency of anodic aluminum oxide to absorb water, forming a variety of hydrated species having impaired dielectric properties appears to be, at least in part, a function of the hydration status of the outermost portion of the anodic oxide at the end of the anodizing process. Lilienfeld, in U.S. Pat. No. 2,826,724 states that "it is the hydration stratum of the oxide film, adjacent the film-electrolyte interface, which causes most of the power loss; and that the progressive development of hydration at the interface causes the aforesaid instability."

Alwitt, in U.S. Pat. No. 3,733,291, describes a method of removing the residual hydration layer from the outer surface of anodized aluminum capacitor foil which has been exposed to a pre-anodizing hydration step (Alwitt refers to this as a "preboil") prior to anodizing in order to conserve electrical energy during anodizing. Alwitt employs a dilute phosphoric acid solution, generally with a small chromate content (to inhibit corrosion), to dissolve the outer, hydration layer.

In addition to the problems associated with the residual hydration layer on anodized foil, which has been processed through a pre-anodizing hydration or preboil step prior to anodizing, there exists another potential problem with the stability of the anodic oxide grown on preboiled aluminum foil. The formation of the anodic oxide on preboiled foil takes place via a dehydration reaction in which the layer of pseudo-boehmite (i.e. hydration product) is progressively dehydrated from the foil-oxide interface outward. Apparently, the dehydration does not take place through the ejection of water molecules but rather through the ejection of hydrogen ions and the liberation of oxygen gas within the body of the oxide. The liberated oxygen gas may become trapped within the anodic oxide, rendering the oxide susceptible to cracking and dielectric failure in service. This topic is treated well in the article, entitled: "Trapped Oxygen in Aluminum Oxide Films and Its Effect on Dielectric Stability", by Walter J. Bernard and Philip G. Russell (*Journal of the Electrochemical Society*, Volume 127, number 6, Jun. 1980, pages 1256-1261).

Stevens and Shaffer describe a method of determining the concentration of oxide flaws as a function of distance from the metal-oxide interface for trapped-oxygen flaws which are exposed via thermal relaxation steps followed by re-anodizing under carefully controlled and monitored conditions ("Defects in Crystalline Anodic Aluminum", by J. L. Stevens and J. S. Shaffer, *Journal of the Electrochemical Society*, volume 133, number 6, Jun. 1986, pages 1160-1162).

Stabilization processes have been developed which tend to expose and repair trapped oxygen flaws (in anodic oxide films on preboiled foils) as well as impart hydration resistance to the oxide film. Examples of these processes are described in U.S. Pat. Nos. 4,113,579 and 4,437,946.

For maximum anodic oxide film stability on aluminum foil, it is desirable to form the anodic film in a phosphate solution and, again, for maximum stability (i.e., freedom from trapped oxygen flaws) the foil should not be preboiled prior to the anodizing process.

The skilled artisan has therefore been limited in the ability to form oxides on the anode at high voltage, particularly with phosphate incorporation into the oxide layer.

BRIEF SUMMARY OF THE INVENTION

It is object of the present invention to provide an improved process for anodizing aluminium.

It is another object of the present invention to provide a process for anodizing an aluminum surface at high voltage, over 220 volts, without pre-boil or surface hydration, while still incorporating the advantages offered by phosphate in the oxide layer. This has previously been unavailable to those of ordinary skill in the art.

It is another object of the present invention to provide an anodizing solution which can provide a capacitor with a capacitance above $9\,\mu\text{f-V/cm}^2$ at 250V which was previously not available to the art.

A particular feature of the present invention is that one variation of the electrolyte family described in U.S. Pat. No. 6,409,905, i.e, glycerine-based electrolytes containing orthophosphate as the anionic portion of the ionogen may be used to anodize aluminum foil to high voltages, for example 1000 volts. The use of these electrolytes, then, overcomes the limitations of traditional aqueous phosphate electrolytes in so far as the maximum anodizing voltage achievable with aqueous electrolytes (i.e. 220 volts, as given in U.S. Pat. No. 3,733,291) may be exceeded by many hundreds of volts. Furthermore, the use of low-water content glycerine-based, orthophosphate-containing electrolyte solutions for anodizing aluminum avoids the corrosion of the anode foil by essentially eliminating the subsequent formation of aluminum phosphate precipitates which normally occurs during the anodization.

Another particular feature is that when the low-water content, glycerine based electrolytes of U.S. Pat. No. 6,409,905 are used to anodize aluminum foil which has not been preboiled (i.e. relatively hydrated-oxide free) an unanticipated high capacitance value is obtained over prior art anodizing techniques for the intermediate voltage anodizing range of about 250-350 volts.

A preferred embodiment is provided in a capacitor comprising an aluminum anode and a dielectric layer comprising phosphate doped aluminum oxide. The capacitor has a CV Product of at least $9\,\mu\text{F-V/cm}^2$ of surface area at 250 volts.

Yet another embodiment is provided in a process for preparing a capacitor. The process comprises forming an aluminum plate. Without pre-hydration the plate is contacted with an anodizing solution comprising glycerine, 0.1 to 2.0%, by weight, water and 0.01 to 0.5%, by weight, orthophosphate. A voltage is applied to the aluminum plate of at least 220 volts.

Yet another embodiment is provided in process for preparing a capacitor. The process comprises forming an aluminum plate. The plate is contacted with an anodizing solution comprising glycerine, 0.1 to 2.0%, by weight, water and 0.01 to 0.5%, by weight, orthophosphate. A voltage is applied to the aluminum plate and an initial current is determined. The first voltage is maintained until a first measured current is no more than 50% of the initial current. The voltage is increased and initial current redetermined. The increased voltage is maintained until a second measured current is no more than 50% of the redetermined initial current. The voltage increases and voltage maintaining are continued until a final voltage is achieved.

A particularly preferred embodiment is provided in a capacitor comprising an aluminum anode and a dielectric layer comprising phosphate doped aluminum oxide. The capacitor has a CV Product of at least $9\,\mu\text{F-V/cm}^2$ of surface area at 250 volts. Furthermore, the capacitor is formed by the process of: forming an aluminum plate; contacting the plate with an anodizing solution comprising glycerine, 0.1 to 2.0%, by weight, water and 0.01 to 0.5%, by weight, orthophosphate; applying a voltage to the aluminum plate and determining an initial current; maintaining the first voltage until a first measured current is no more than 50% of the initial current; increasing the voltage and redetermining the initial current; maintaining the increased voltage until a second measured current is no more than 50% of the redetermined initial current, and continuing the increasing of the voltage and maintaining the increased voltage until a final voltage is achieved.

DETAILED DESCRIPTION OF THE INVENTION

Figure 1:
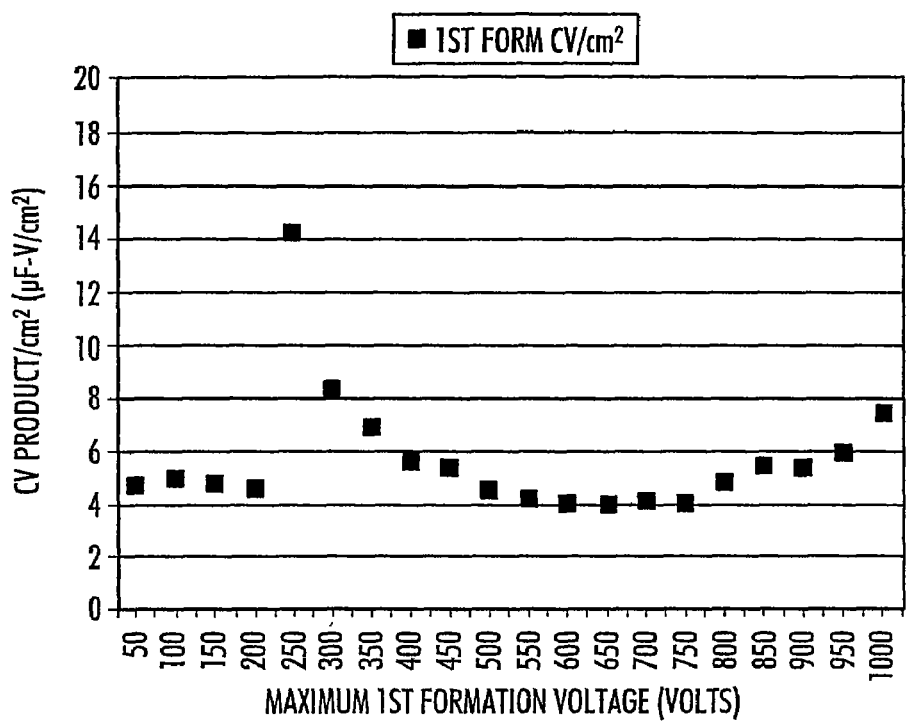
FIG. 1 is a graph of an embodiment of the present invention illustrating the improvement of the present invention as indicated by the graph of $\mu\text{f-V/cm}^2$ as a function of voltage. The area (in $\text{cm}^2$) is the surface area of the anode which increases with an etched surface as known in the art.

The inventors of the present application have found that the modification of the electrolytes described in U.S. Pat. No. 6,409,905 to be useful for the anodizing of aluminum foil to several hundred volts. Generally speaking, glycerine solutions of ammonium, amine, or alkali metal orthophosphate salts containing from about 0.01 wt % to about 0.5 wt % soluble orthophosphate salt and from about 0.1% to about 2.0% water, more preferably about 0.1% to about 1.0% water, may be successfully used to anodize aluminum foil to high voltages. Lower orthophosphate salt concentrations and higher solution resistivities are preferably used for higher anodizing voltages in accordance with the principles of aluminum anodizing which have long been established by those familiar with the art. For most high voltage applications, we have found it to be advantageous to employ dibasic potassium phosphate as the ionogen, at a preferred concentration of 0.01% to 0.1%, by weight, depending upon the maximum desired voltage.

The electrolyte soluble orthophosphate salt may be an ammonium phosphate, an alkali metal phosphate, an amine phosphate, or mixtures thereof. Suitable alkali metal salts include, but are not limited to, mono-sodium phosphate, di-potassium phosphate, and sodium potassium phosphate. Suitable ammonium salts include, but are not limited to, mono-ammonium phosphate or di-ammonium phosphate.

The solution temperature employed may be varied over a wide range, for example, from room temperature, or about 25° C., to about 125° C., but the temperature is most conveniently maintained between about 80° C. and 105° C. In this range (i.e. about 80° C. and 105° C.) the water content of the electrolyte will tend to be automatically maintained between about 0.2% and 1.0% by contact with the atmosphere through the vapor pressure of the water present and the hygroscopicity of the glycerine solvent.

It is preferable that the anode metal is placed into the anodizing solution followed by sequentially increasing the voltage stepwise with current age down prior to the next increment.

The voltage increase is preferably done in increments. The maximum size of the increment is chosen to be less than that necessary to create failure in the oxide. As the resistivity of the anodizing solution increases the maximum voltage step which can be implemented without oxide failure increases. Based on the present invention, a voltage step of less than 75 volts is preferable. Higher steps can be taken, particularly at higher voltages with high resistivity anodizing solutions, yet the time required for adequate age down increases and therefore no substantial benefit is observed. Smaller voltage increases can be employed with the disadvantage being loss of efficiency. It is most desired that the voltage increase be at least 20 volts per step to optimise the efficiency without compromising product quality. A voltage increase of about 50 volts for each step has been determined to be optimal for the present invention.

After each voltage increase the voltage is maintained until a sufficient decrease in current is realized. The more the current is allowed to decrease prior to the next voltage increase the better for efficiency of anodization yet a decrease is observed in productivity. It is preferred that the anode be maintained at voltage long enough to allow the current to decrease to at least less than 50% of the original current and more preferably at least 30% of the original current. The upper limit of hold time for current decrease is based on efficiency. Allowing the current to decrease to 1%, or less, of the original current is acceptable yet the loss in efficiency exceeds the advantages obtained. It is most preferred that the voltage be maintained at each step for a time sufficient to allow the current to decrease to about 10-30% of the original current. This has been determined to be an optimal condition between suitable product and manufacturing efficiency. It has been found that a decrease in current to at least about 20% of the original current at each voltage step is optimum to achieve superior product performance with reasonable manufacturing efficiency. The current may be allowed to decrease to a low level at the last voltage step in order to obtain a very low leakage dielectric film.

The process for manufacturing a stacked foil conductive polymer is known in the art. Specifically, stacked foil conductive polymer-containing solid capacitors may be treated with the inventive solution to produce an anodic oxide film on the edges of the coupon, repair any cracks in the anodic oxide from handling, and impart hydration resistance to the anodic oxide already present on the coupon.

The stacked foil conductive polymer-containing solid capacitors are typically prepared from anode foil coupons cut from etched and anodized foil and mounted on carrier bars, by welding or similar means, for processing.

In a particularly preferred embodiment coupons are cut and welded to a process bar. Masking is applied to prevent wicking of the materials used to produce the conductive polymer into the weld zone of the coupons.

The coupons are then immersed in an anodizing electrolyte of the present invention and are processed as described above.

The edge-anodized and rinsed coupons are then ready for processing into capacitors

EXAMPLES

A series of aluminum coupon anodizing runs was conducted using a solution of dibasic potassium phosphate, $K_2HPO_4$, water and glycerine, within the concentrations of the present invention, at a temperature of 95° C.±5° C. The maximum voltage of each anodizing run was increased by 50 volts per run, from 50 to 1000 volts. The voltage used for each run was applied in a series of 50-volt steps. The current was allowed to "age-down" to below 20% of the initial value at each voltage step before again raising the voltage.

The concentration of $K_2HPO_4$ varied with voltage with 0.05% being used for the first half of the series of coupons and 0.01% $K_2HPO_4$ for the higher voltages.

The coupon capacitance was measured for each anodizing voltage and the CV product (capacitance×voltage) was calculated per $Cm^2$ of surface area throughout the formation voltage range. The results are provided in FIG. 1.

FIG. 1 shows that the $CV/cm^2$ product for plain aluminum foil is approximately 5 microfarad-volts per square centimeter for the first 200 volts, then the CV product jumps to approximately 14 and decreases back to the baseline of about 5 $CV/cm^2$ product over the next 150 volts. This unanticipated increase is thought to be due to a structural rearrangement within the oxide as 250 anodizing volts are approached. Anode coupons held as long as 15 hours at voltage still show this anomalously high CV product at 250 anodizing volts.

Figure 2:
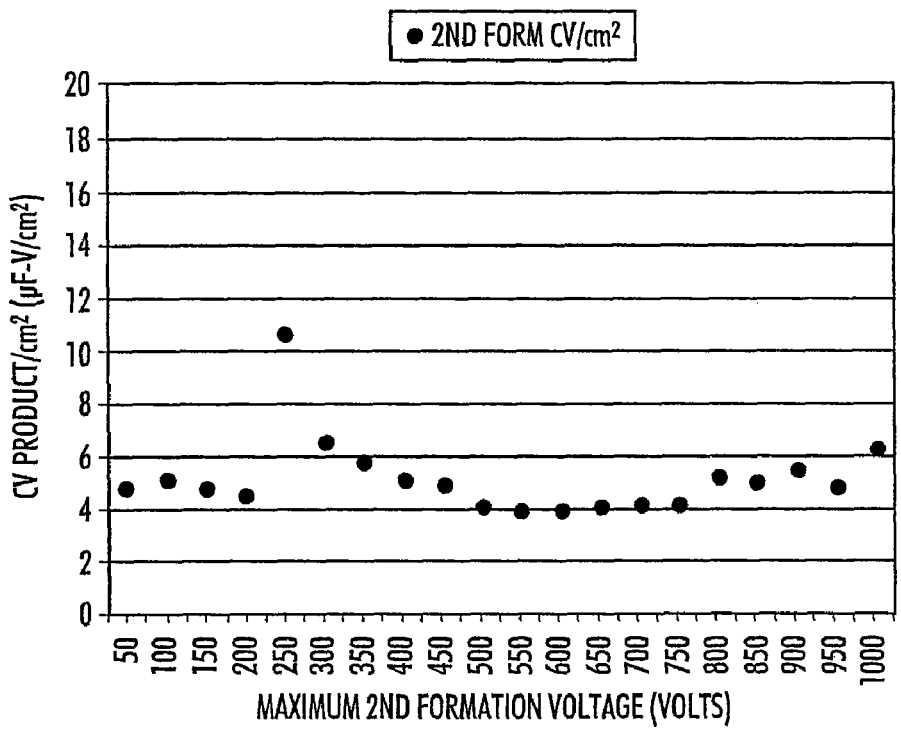
FIG. 2 is a graph of an embodiment of the present invention illustrating the improvement of the present invention as indicated by the graph of $\mu\text{f-V/cm}^2$ as a function of voltage following heat-treatment of the anodized coupons at 400° C. for 15 minutes, followed by anodizing the original voltage in the original solution for 1 hour.

The anomalously high CV at 250 volts is apparent, though smaller, even following a thermal relaxation step at 400° C. (15 minutes) followed by a second anodizing step in which the coupons are held at the original anodizing voltages for an hour, as shown in FIG. 2.

If the foil is first preboiled prior to anodizing in the electrolytes of the present invention, the anodizing proceeds smoothly up to very high voltages, but the anomalous CV behaviour, at 250 volts, observed with un-preboiled foil is absent.

Figure 3:
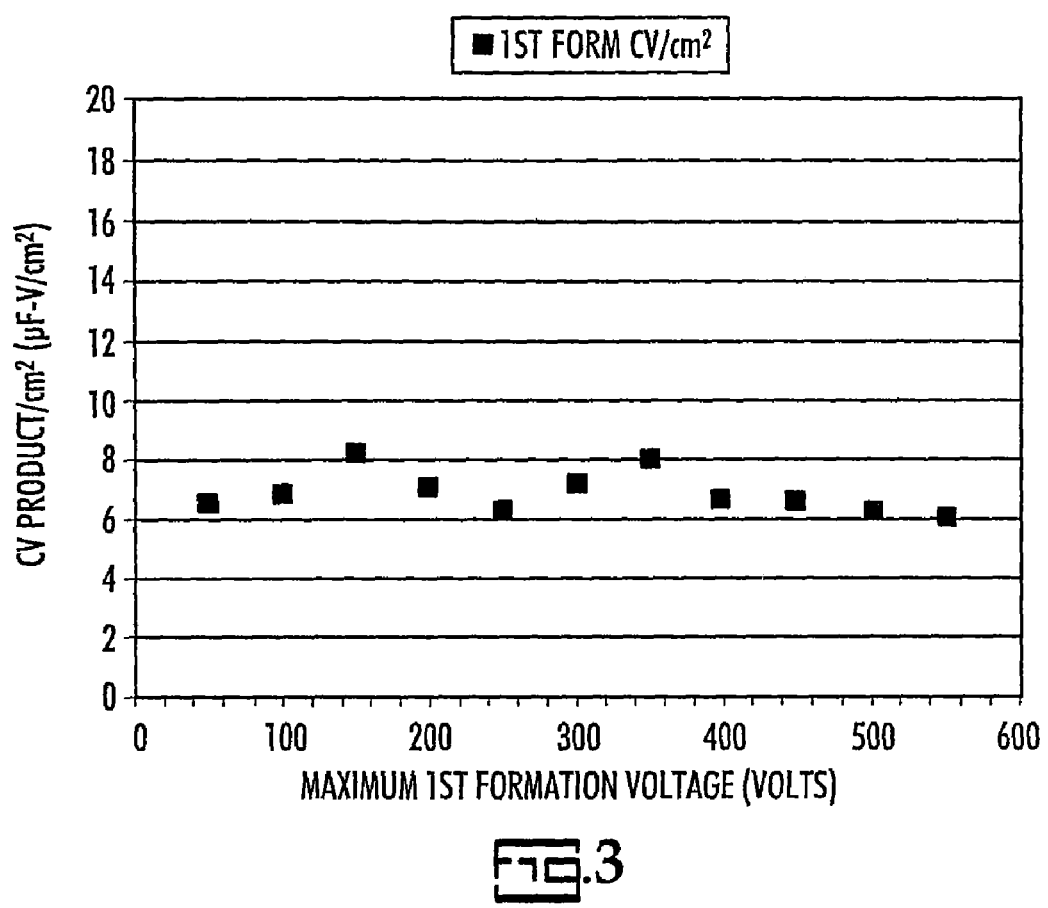
FIG. 3 is a graph illustrating the impact of a hydrated surface and the absence of the high capacitance observed when a non-hydrated surface is treated in accordance with the present invention.

FIG. 3 shows the results obtained with coupons which were exposed to water at 95° C.±3° C. for 5 minutes prior to anodizing. These coupons were anodized in the same manner as those of FIG. 1. In this case the CV product of approximately 7 microfarad-volts/$cm^2$ is that commonly found for crystalline anodic aluminum oxide and no anomaly is seen.

We have, then, found that orthophosphate salt solutions in glycerine may be used to anodize aluminum foil to at least 1000 volts.

We have found that foil anodized in these solutions exhibits an anomalously high capacitance at 250-350 volts. This anomaly is probably due to an oxide structure change in these solutions at about the 250 volt anodizing voltage.

We have demonstrated that this anomaly is not observed with "preboiled" foil.

We have found that both very high voltages (i.e., 1,000 volts) and very high capacitance (at 250 volts) are made possible through the use of solutions which are self maintaining from the standpoint of water content (i.e. they stabilize at about 0.2 to 1.0% at 80-105° C.).

Furthermore, analysis of the highest-voltage solution used to prepare the coupons for FIG. 1 was found to contain only 2 ppm aluminum after the anodizing work was completed, signifying an almost complete elimination of the corrosion associated with prior art aqueous phosphate anodizing solutions.

The invention has been described with particular emphasis on the preferred embodiments. It would be realized from the teachings herein that other embodiments, alterations, and configurations could be employed without departing from the scope of the invention which is more specifically set forth in the claims which are appended hereto.

The invention claimed is:

1. A process for preparing a capacitor comprising:
   forming an aluminum plate;
   without pre-hydration contacting said plate with an anodizing solution comprising glycerine, 0.1 to about 2.0%, by weight, water and 0.01 to about 0.5%, by weight, soluble orthophosphate;
   applying a first voltage to said aluminum plate and determining an initial current;
   maintaining said first voltage until a first measured current is no more than 50% of said initial current;
   increasing said first voltage to a second voltage and redetermining an initial current at said second voltage;
   maintaining said second voltage until a second measured current is no more than about 50% of said redetermined initial current, and
   continuing said increasing said voltage and said maintaining said increased voltage until a final voltage is achieved,
wherein said capacitor has a capacitance above 9 µf–V/cm² at 250 volts.

2. The process for preparing a capacitor of claim 1 wherein said voltage is increased by no more than about 75 volts.

3. The process for preparing a capacitor of claim 2 wherein said voltage is increased by at least about 20 V to no more than about 50 V.

4. The process for preparing a capacitor of claim 1 wherein said first measured current or said second measured current is from about 1 to about 50% of said initial current.

5. The process for preparing a capacitor of claim 4 wherein said first measured current or said second measured current is from about 10 to about 30% of said initial current.

6. The process for preparing a capacitor of claim 5 wherein said first measured current or said second measured current is about 20% of said initial current.

7. The process for preparing a capacitor of claim 1 wherein said anodizing solution is at a temperature of about 25° C. to about 125° C.

8. The process for preparing a capacitor of claim 7 wherein said anodizing solution is at a temperature of about 80° C. to about 105° C.

9. The process for forming a capacitor of claim 1 wherein said anodizing solution comprises about 0.01 to about 0.1% soluble orthophosphate.

10. The process for forming a capacitor of claim 1 wherein said soluble orthophosphate is selected from a group consisting of ammonium phosphate, alkali metal phosphate, amine phosphate and mixtures thereof.

11. The process for forming a capacitor of claim 1 wherein said soluble orthophosphate is selected from a group consisting of mono-sodium phosphate, di-potassium phosphate, and sodium potassium phosphate.

12. The process for forming a capacitor of claim 1 wherein said soluble orthophosphate is selected from a group consisting of mono-ammonium phosphate and di-ammonium phosphate.

\* \* \* \* \*